United States Patent
Pimentel

(10) Patent No.: US 8,225,091 B1
(45) Date of Patent: Jul. 17, 2012

(54) SYSTEMS AND METHODS FOR PROTECTING SENSITIVE FILES FROM UNAUTHORIZED ACCESS

(75) Inventor: Plinio Pimentel, Highland, UT (US)

(73) Assignee: Crimson Corporation, Dover, DE (US)

( * ) Notice: Subject to any disclaimer, the term of this patent is extended or adjusted under 35 U.S.C. 154(b) by 1729 days.

(21) Appl. No.: 10/813,248

(22) Filed: Mar. 30, 2004

(51) Int. Cl.
*H04L 29/06* (2006.01)

(52) U.S. Cl. ............................ 713/165; 713/193; 726/17

(58) Field of Classification Search .................. 713/165, 713/193, 183, 164, 185, 166, 167; 726/4, 726/11, 13, 17, 27, 28, 29, 30; 709/225, 709/232, 229
See application file for complete search history.

(56) References Cited

U.S. PATENT DOCUMENTS

| | | | |
|---|---|---|---|
| 5,265,159 A * | 11/1993 | Kung | 713/193 |
| 6,550,012 B1 | 4/2003 | Villa et al. | |
| 6,643,778 B1 | 11/2003 | Nakazawa | |
| 6,715,084 B2 | 3/2004 | Aaron et al. | |
| 6,721,890 B1 | 4/2004 | Shrikhande | |
| 6,889,210 B1 * | 5/2005 | Vainstein | 705/57 |
| 7,647,402 B2 * | 1/2010 | McBrearty et al. | 709/225 |
| 2002/0129152 A1 * | 9/2002 | McBrearty et al. | 709/229 |
| 2003/0056095 A1 * | 3/2003 | Elliott et al. | 713/164 |
| 2004/0003289 A1 * | 1/2004 | Bhogal et al. | 713/201 |
| 2004/0123150 A1 * | 6/2004 | Wright et al. | 713/201 |
| 2004/0153675 A1 * | 8/2004 | Dorn et al. | 713/202 |

* cited by examiner

*Primary Examiner* — Gilberto Barron, Jr.
*Assistant Examiner* — Izunna Okeke
(74) *Attorney, Agent, or Firm* — Austin Rapp & Hardman

(57) ABSTRACT

Systems and methods for protecting sensitive files from unauthorized access are disclosed. An exemplary method involves detecting a connection of the computing device to an electronic device. An authorized connection list is accessed. It is then determined whether the connection is identified in the authorized connection list. If the connection is not identified in the authorized connection list, the method involves accessing sensitive file information which identifies at least one sensitive file stored on the computing device, and preventing access to the at least one sensitive file identified by the sensitive file information.

18 Claims, 10 Drawing Sheets

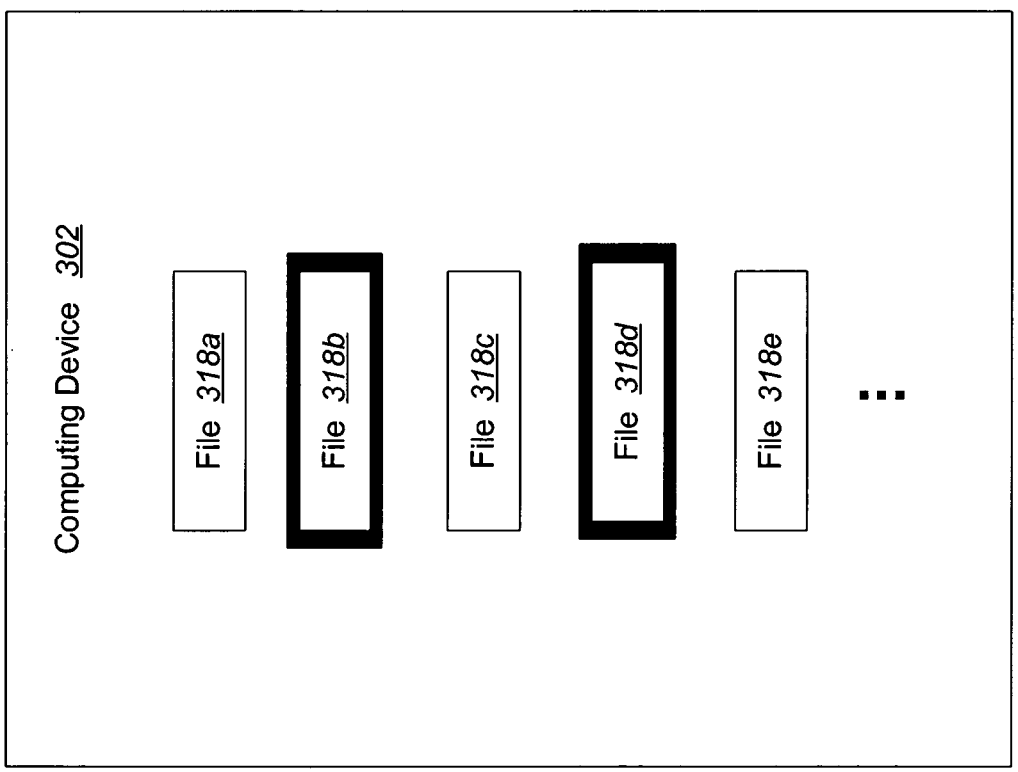

SYSTEMS AND METHODS FOR PROTECTING SENSITIVE FILES FROM UNAUTHORIZED ACCESS

TECHNICAL FIELD

The present invention relates generally to computer security. More specifically, the present invention relates to systems and methods for protecting sensitive files on a computing device from unauthorized access.

BACKGROUND

Computer and communication technologies continue to advance at a rapid pace. Indeed, computer and communication technologies are involved in many aspects of a person's day. For example, many devices being used today have a small computer inside of the device. These small computers come in varying sizes and degrees of sophistication. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Computers are frequently used to store sensitive information. Unfortunately, the sensitive information that is stored on computers is often targeted by unauthorized users, sometimes referred to as intruders. Intruders may act in two different ways. Passive intruders attempt to read files that they are not authorized to read. Active intruders attempt to make unauthorized changes to data. Some intruders may be highly skilled and willing to devote a substantial amount of time to breaking the security of a computer system.

The term "security" refers generally to the problems involved in making sure that files are not read or modified by unauthorized persons. From a security perspective, computer systems have at least two goals: data confidentiality and data integrity. Data confidentiality means that secret data should remain secret. Data integrity means that unauthorized users should not be able to modify any data without the owner's permission.

Computers are frequently connected to other computers and/or electronic devices, often via computer networks. This complicates the issue of providing adequate security. When a computer is connected to a network, users of other computing devices that are also connected to the network may have access to the sensitive files stored on the computer. If this is not desirable, then steps are generally taken to prevent access to the sensitive files.

Within a business context, as corporate performance and end-user productivity have become increasingly dependent on computers, computer support personnel are continuously under pressure to ensure computer security. The support personnel are also under pressure to perform tasks as efficiently as possible which may include minimizing effects to existing computer systems and networks or disturbance of computer users. Accordingly, benefits may be realized by improved systems and methods for protecting sensitive files on a computing device from unauthorized access.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 3 is a block diagram illustrating a plurality of files stored on the computing device;

DETAILED DESCRIPTION

Figure 1:
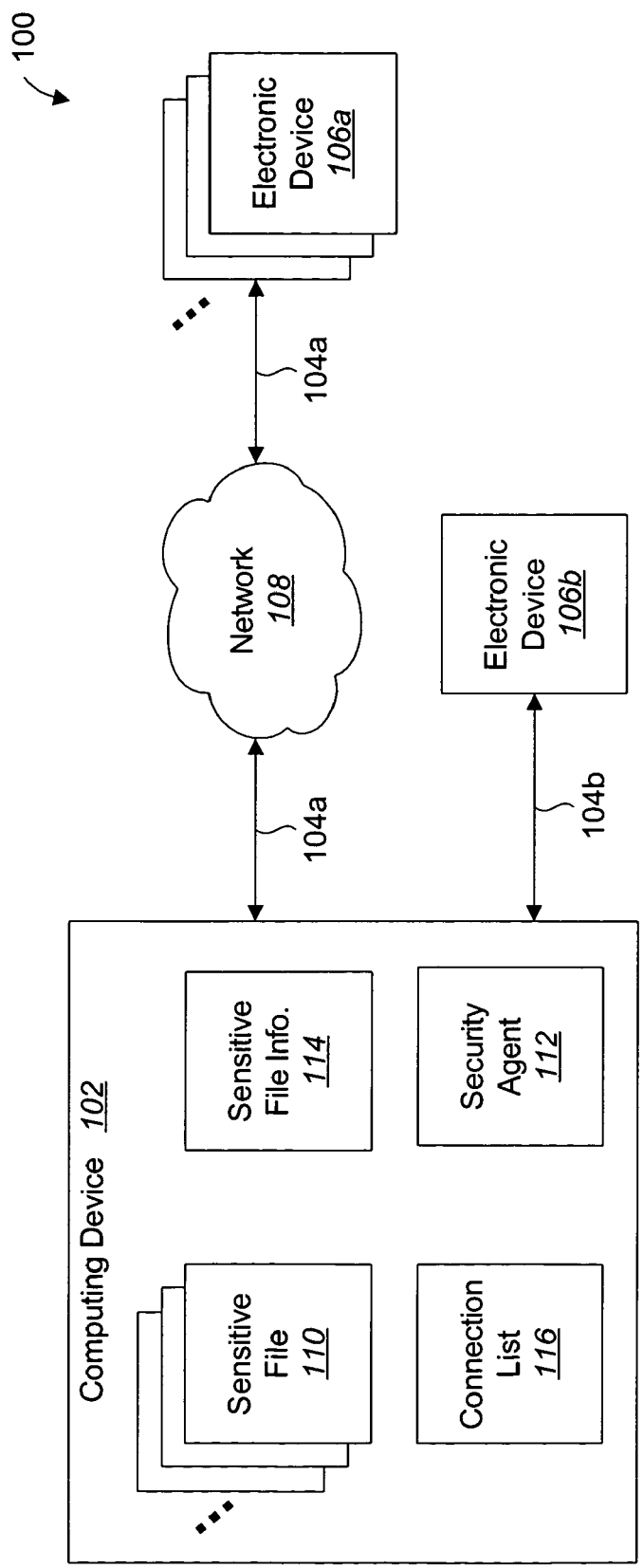
FIG. 1 is a block diagram illustrating an exemplary system in which some embodiments may be practiced.

In a computing device, a method for protecting sensitive files from unauthorized access is disclosed. The method involves detecting a connection of the computing device to an electronic device. An authorized connection list is accessed. It is determined whether the connection is identified in the authorized connection list. If the connection is not identified in the authorized connection list, the method also involves accessing sensitive file information which identifies at least one sensitive file stored on the computing device and preventing access to the at least one sensitive file identified by the sensitive file information.

In some embodiments, if the connection is not identified in the authorized connection list the method also involves detecting termination of the connection. If the computing device does not have any other unauthorized connections, access is restored to the at least one sensitive file identified by the sensitive file information.

In some embodiments, the connection occurs via a computer network. The network may be a wireless network, and the computing device may be a mobile computing device. Alternatively, the connection may be a direct connection.

Access to the at least one sensitive file may be prevented in a variety of different ways. For example, preventing access to the at least one sensitive file may involve locking the at least one sensitive file. As another alternative, preventing access to the at least one sensitive file may involve encrypting the at least one sensitive file. As yet another alternative, preventing access to the at least one sensitive file may involve moving the at least one sensitive file to a host-protected area of the storage device.

The sensitive file information may include a reference to a directory in which the at least one sensitive file is stored. Alternatively, the sensitive file information may include a list of the at least one sensitive file.

The authorized connection list may include a list of at least one authorized network. Alternatively, the authorized connection list may include a list of at least one authorized connection type.

A method in an administrative system which distributes software to a plurality of computing devices on an enterprise network is also disclosed. The method performed by the administrative system involves providing a security agent. After installation on a computing device the security agent is configured to implement a method that involves detecting a connection of the computing device to an electronic device. The method performed by the security agent also involves accessing an authorized connection list and determining whether the connection is identified in the authorized connection list. If the connection is not identified in the authorized connection list, the method performed by the security agent also involves accessing sensitive file information which identifies at least one sensitive file stored on the computing device and preventing access to the at least one sensitive file identified by the sensitive file information. The method performed by the administrative system also involves transmitting the security agent to the plurality of computing devices via the enterprise network. In some embodiments, the method performed by the security agent also involves providing the authorized connection list and the sensitive file information, and transmitting the authorized connection list and the sensitive file information to the plurality of computing devices via the enterprise network.

A computing device that is configured for protecting sensitive files from unauthorized access is also disclosed. The computing device includes a processor and memory in electronic communication with the processor. Instructions are stored in the memory. The instructions are executable to implement a method that involves detecting a connection of the computing device to an electronic device. The method also involves accessing an authorized connection list. The method also involves determining whether the connection is identified in the authorized connection list. If the connection is not identified in the authorized connection list, the method also involves accessing sensitive file information which identifies at least one sensitive file stored on the computing device and preventing access to the at least one sensitive file identified by the sensitive file information.

A computer-readable medium for storing program data is also disclosed. The program data includes executable instructions for implementing a method that involves detecting a connection of a computing device to an electronic device. The method also involves accessing an authorized connection list. The method also involves determining whether the connection is identified in the authorized connection list. If the connection is not identified in the authorized connection list, the method also involves accessing sensitive file information which identifies at least one sensitive file stored on the computing device and preventing access to the at least one sensitive file identified by the sensitive file information.

Various embodiments of the invention are now described with reference to the Figures, where like reference numbers indicate identical or functionally similar elements. It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a block diagram illustrating an exemplary system 100 in which some embodiments may be practiced. The system 100 includes a computing device 102. A computing device 102, as used herein, is any device that includes a digital processor capable of receiving and processing data. A computing device 102 includes the broad range of digital computers, including hand-held computers, personal computers, servers, mainframes, supercomputers, microcontrollers, and the like.

The computing device 102 is capable of establishing one or more connections 104 to other electronic devices 106. A connection 104 between the computing device 102 and an electronic device 106 is established if data may be transmitted from the computing device 102 to the electronic device 106, or vice versa. As shown, a connection 104a between the computing device 102 and an electronic device 106a may occur via a computer network 108. Thus, signals transmitted from the computing device 102 to an electronic device 106a, and vice versa, may pass through one or more intermediate nodes en route to its destination. Alternatively, a direct connection 104b may be formed between the computing device 102 and an electronic device 106b.

Some examples of electronic devices 106 to which the computing device 102 may be connected include other computing devices as well as removable storage devices. A removable storage device, as used herein, refers to any storage device that is plugged into an external port on a computing device 102. Examples of removable storage devices include thumb drives (sometimes referred to as pen drives, keychain drives, key drives, or memory keys) and portable hard drives.

One or more sensitive files 110 are stored on the computing device 102. As used herein, the term sensitive file 110 should be interpreted broadly to include any file that includes information that one or more individuals would like to keep from being disclosed to the public.

In some situations, the computing device 102 may establish one or more connections 104 that provide other individuals with undesired access to the sensitive files 110 on the computing device 102. For example, the computing device 102 may be a mobile computing device 102. When a user of the mobile computing device 102 enters a wireless hot spot (i.e., the geographic boundary covered by a wireless access point of a wireless network 108), the mobile computing device 102 may establish a connection 104 to the wireless network 108, sometimes without the user's knowledge. This may provide other computing devices that are also connected to the wireless network 108 with undesired access to the sensitive files 110 on the computing device 102.

Of course, other types of computing devices 102 may also establish connections 104 that provide undesired access to sensitive files 110. For example, a user of a desktop computer may leave the computer unattended for a brief period of time while taking a break. During this time, another individual may connect a removable storage device to the computing device 102, and copy sensitive files from the computing device 102 to the removable storage device.

To protect the sensitive files 110 on the computing device 102 from undesired access, a security agent 112 is running on the computing device 102. The security agent 112 is a software module, in accordance with how that term is defined above. The security agent 112 monitors connections 104 of the computing device 102 to other electronic devices 106. When an unauthorized connection 104 is detected, the security agent 112 prevents access to the sensitive files 110 on the computing device 102. The operation of the security agent 112 will be described in greater detail below.

The security agent 112 may access and use certain kinds of information while it is performing its tasks. For example, the security agent 112 may access and use sensitive file information 114 to identify the sensitive files 110 on the computing device 102. The security agent 112 may access and use an authorized connection list 116 to determine whether a particular connection 104 is authorized or not. The sensitive file information 114 and the authorized connection list 116 will be described in greater detail below. Although the sensitive file information 114 and the authorized connection list 116 are shown as residing on the computing device 102, in alternative embodiments the sensitive file information 114 and the authorized connection list 116 may reside on a separate device that is in electronic communication with the computing device 102. Also, although the sensitive file information 114 and the authorized connection list 116 are shown as being separate from the security agent 112 in FIG. 1, in alternative embodiments the sensitive file information 114 and the authorized connection list 116 may be part of the security agent 112.

Figure 2:
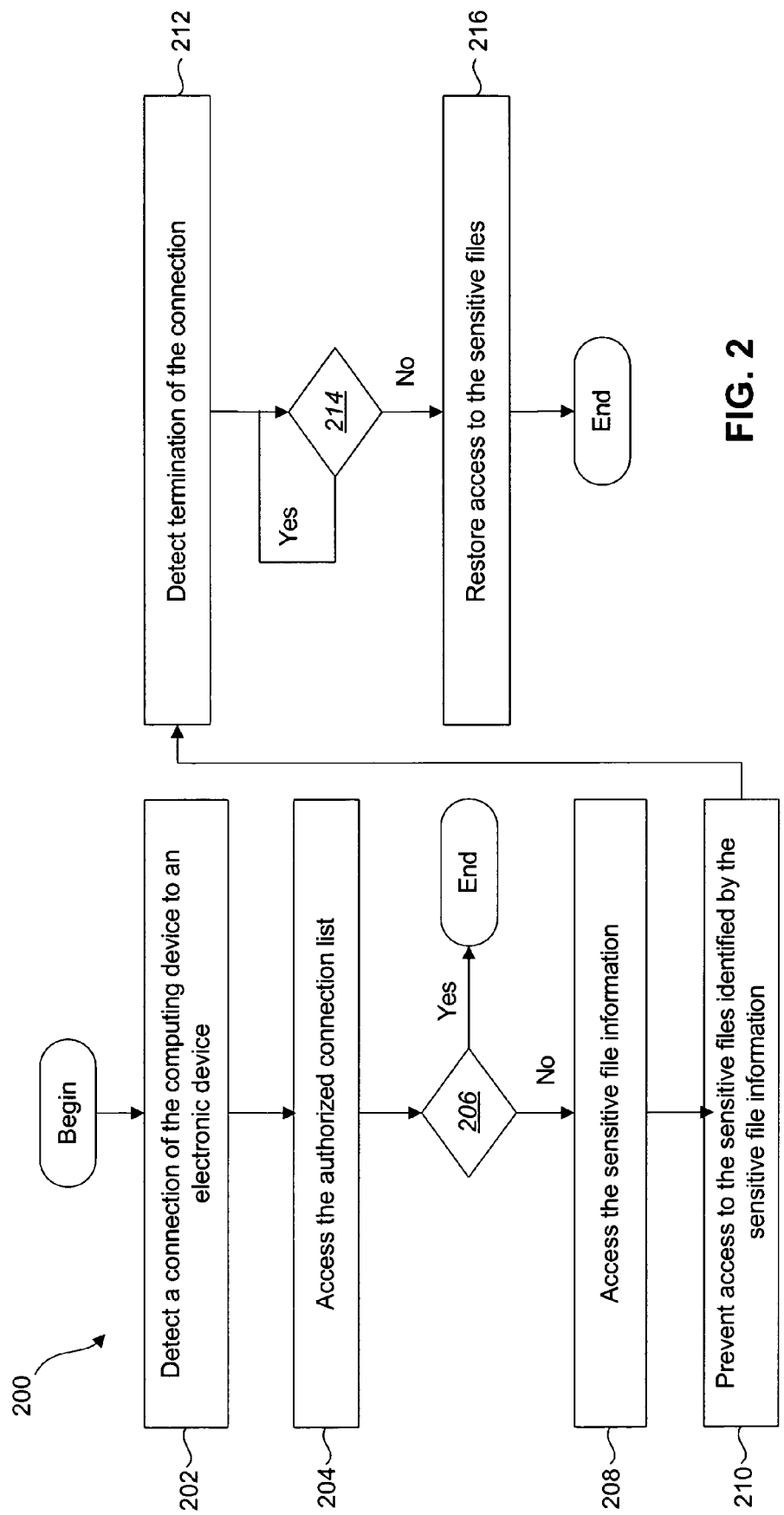
FIG. 2 is a flow diagram illustrating an embodiment of a method which may be performed by the security agent.

FIG. 2 is a flow diagram illustrating an embodiment of a method 200 which may be performed by the security agent 112. In typical embodiments, the security agent 112 monitors the connections 104 of the computing device 102. This may involve monitoring the communication ports of the computing device 102. The security agent 112 performs the illustrated method 200 upon detection 202 of a connection 104 between the computing device 102 and another electronic device 106.

Once the connection 104 is detected, the security agent 112 accesses 204 the authorized connection list 116. The security agent 112 then determines 206 whether the connection 104 that was detected in step 202 is identified in the authorized connection list 116. If the connection 104 is identified in the authorized connection list 116, the connection 104 is authorized. Therefore, the security agent 112 takes no action with respect to the sensitive files 110, and the method 200 ends.

If the connection 104 is not identified in the authorized connection list 116, then the connection 104 is not authorized. The security agent 112 then accesses 208 the sensitive file information 114. As indicated above, the sensitive file information 114 identifies sensitive files 110 which are stored on the computing device 102. The security agent 112 then prevents 210 access to the sensitive files 110 identified by the sensitive file information 114. Some exemplary approaches for preventing access to the sensitive files 110 will be described below.

At some point, the unauthorized connection is terminated, and the security agent 112 detects 212 termination of the connection 104. The security agent 112 then determines 214 whether the computing device 102 has any other unauthorized connections 104. If the computing device 102 does not have any other unauthorized connections 104, the security agent 112 restores 216 access to the sensitive files 110 on the computing device 102. If, however, the computing device 102 does have at least one other unauthorized connection 104, the security agent 112 waits until all unauthorized connections 104 have been terminated before restoring 216 access to the sensitive files 110.

The security agent 112 may prevent 210 access to the sensitive files 110 in a variety of different ways. In some embodiments, the security agent 112 may lock the sensitive files 110. FIG. 3 is a block diagram illustrating a plurality of files 318 stored on the computing device 102. The files 318b, 318d are locked, as indicated by the thick lines. The files 318a, 318c, 318e on the computing device 302 are not locked.

The security agent 112 may lock the sensitive files 110 on the computing device 302 (such as the files 318b, 318d) by making a call to an API of the operating system. Windows XP® is an example of an operating system that supports file locking. In some embodiments, when the sensitive files 110 on the computing device 302 are locked, no one has access to the sensitive files 110 including the user of the computing device 102.

Another way in which the security agent 112 may prevent access to the sensitive files 110 is by encrypting the sensitive files 110. In some embodiments, the security agent 112 may prevent access to the sensitive files 110 via encryption if the operating system of the computing device 302 does not support file locking. Windows 98® is an example of an operating system that does not support file locking.

Figure 4:
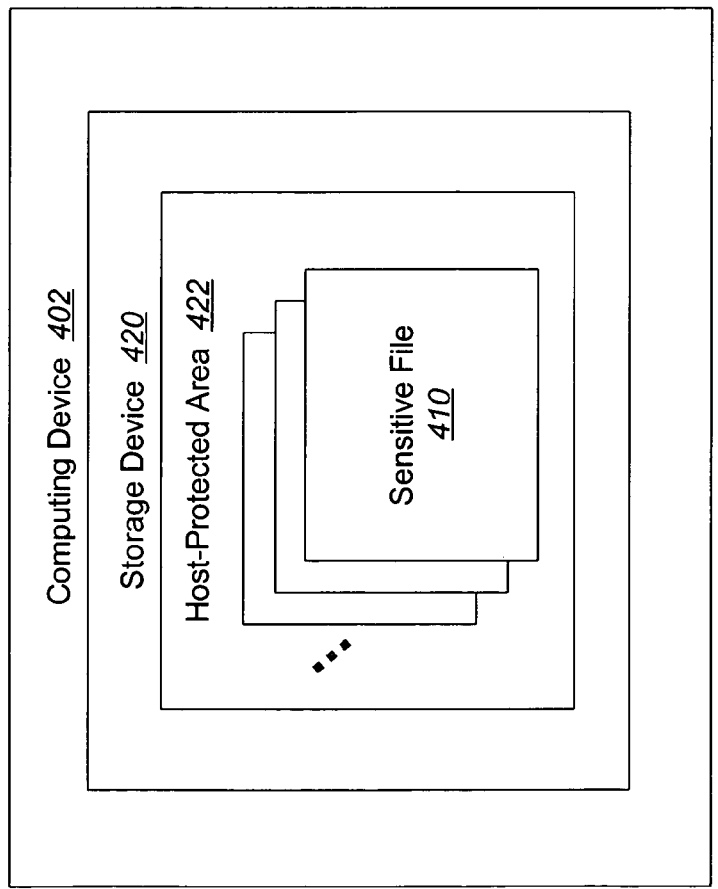
FIG. 4 illustrates a storage device of the computing device.

Another approach for preventing 210 access to the sensitive files 110 involves moving the sensitive files 110 to a different location. FIG. 4 illustrates a storage device 420 of the computing device 402. The sensitive files 410 are stored on the storage device 420. The storage device includes a host-protected area 422, which is a reserved area of the storage device 420 that is hidden from the operating system and the file system. To prevent access to the sensitive files 410, the security agent 112 may move the sensitive files 410 to the host-protected area 422 of the storage device 420.

Figure 5:
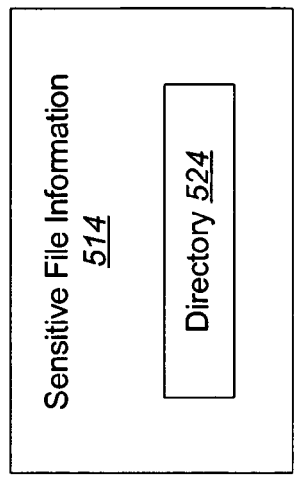
FIG. 5 is a block diagram illustrating an embodiment of the sensitive file information.
Figure 6:
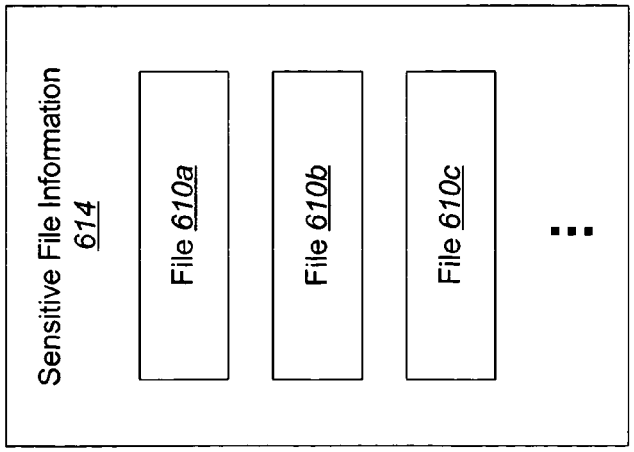
FIG. 6 is a block diagram illustrating another embodiment of the sensitive file information.

FIGS. 5-6 are block diagrams illustrating embodiments of the sensitive file information. There are a variety of different ways in which a user of the computing device 102 may keep track of sensitive files 110 that are stored on the computing device 102. For example, all of the sensitive files 110 on the computing device 102 may be stored within a particular directory. Therefore, as shown in FIG. 5, in some embodiments the sensitive file information 514 may be a reference to a directory 524 in which the sensitive files 110 are stored. When the security agent 112 detects an unauthorized connection 104, the security agent 112 prevents access to all of the files within the directory 524 (including files stored within any subdirectories).

Alternatively, sensitive files 110 may be stored in a variety of different directories throughout the file system of the computing device 102. In such embodiments, as shown in FIG. 6, the sensitive file information 614 may be a list of the sensitive files 610 stored on the computing device 102. When the security agent 112 detects an unauthorized connection 104, the security agent 112 prevents access to all of the files 610 within the list.

Figure 8:
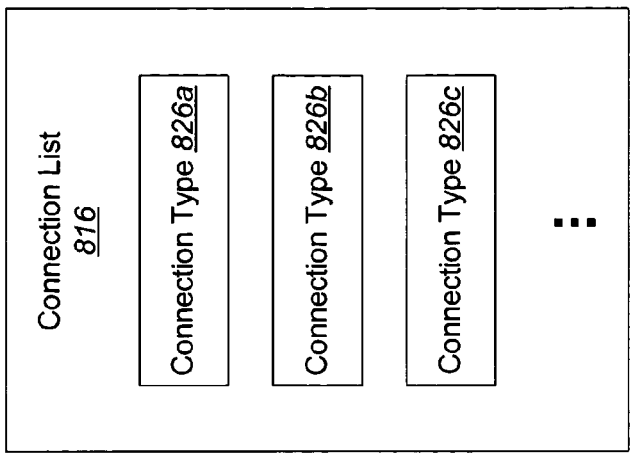
FIG. 8 is a block diagram illustrating another embodiment of the authorized connection list.
Figure 7:
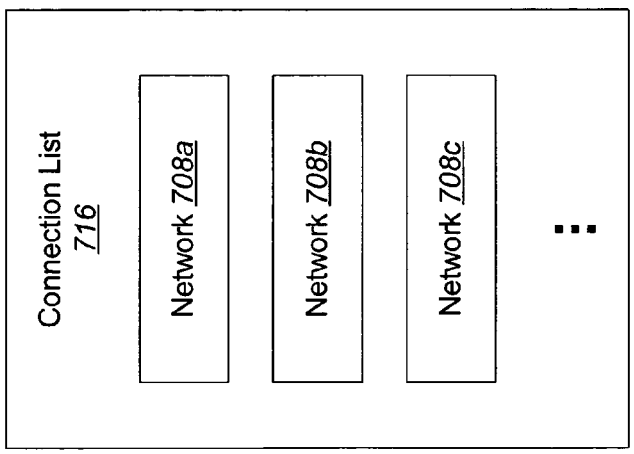
FIG. 7 is a block diagram illustrating an embodiment of the authorized connection list.

FIGS. 7-8 are block diagrams illustrating embodiments of the authorized connection list. As discussed above, the security agent 112 is designed to protect the sensitive files 110 on the computing device 102 from undesired access via unauthorized connections 104. There are a variety of reasons why a particular connection 104 may be unauthorized. For example, a connection 104 to a network 108 may be unauthorized because the network 108 itself is not necessarily trustworthy. This may be the case, for example, when a mobile computing device 102 is connected to a wireless network 108 in a public place (e.g., a coffee shop, airport, etc.). Therefore, the authorized connection list 716 may include a list of authorized networks 708, as shown in FIG. 7.

Alternatively, or in addition, a connection 104 may be unauthorized because of one or more characteristics of the physical medium of the connection. Therefore, the authorized connection list 816 may include a list of authorized connection types 826, as shown in FIG. 8. Examples of different connection types 826 include Ethernet, wireless LAN, cable modem, DSL, firewire, etc.

Figure 9:
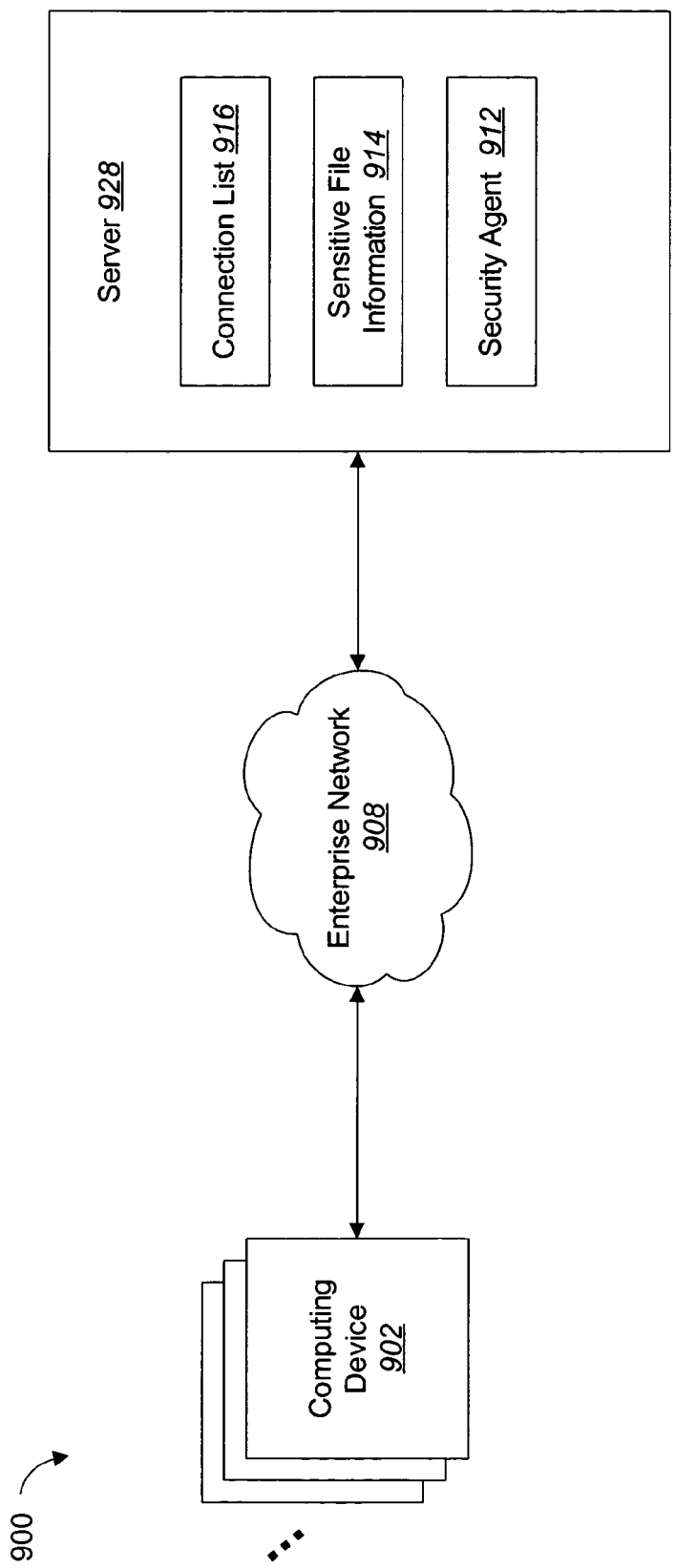
FIG. 9 is a block diagram illustrating an exemplary system in which the security agent may be distributed to and installed on the computing devices of an enterprise.

Under some circumstances, embodiments of the security agent 112 may be installed on some or all of the computing devices 102 that are used by individuals who work for an enterprise (e.g., a corporation, small business, non-profit institution, government body, etc.). FIG. 9 is a block diagram illustrating an exemplary system 900 in which the security agent 912 may be distributed to and installed on the computing devices 902 of an enterprise.

The system 900 includes a server 928. In some contexts, the server 928 may be referred to as an administrative system. The server 928 distributes software to the computing devices 902 in the enterprise via the enterprise computer network 908. The authorized connection list 916, the sensitive file information 914, and the security agent 912 are stored on the server 928. At some point when the computing devices 902 are connected to the network 908, the server 928 transmits the authorized connection list 916, the sensitive file information 914, and the security agent 912 to the computing devices 902.

Figure 10:
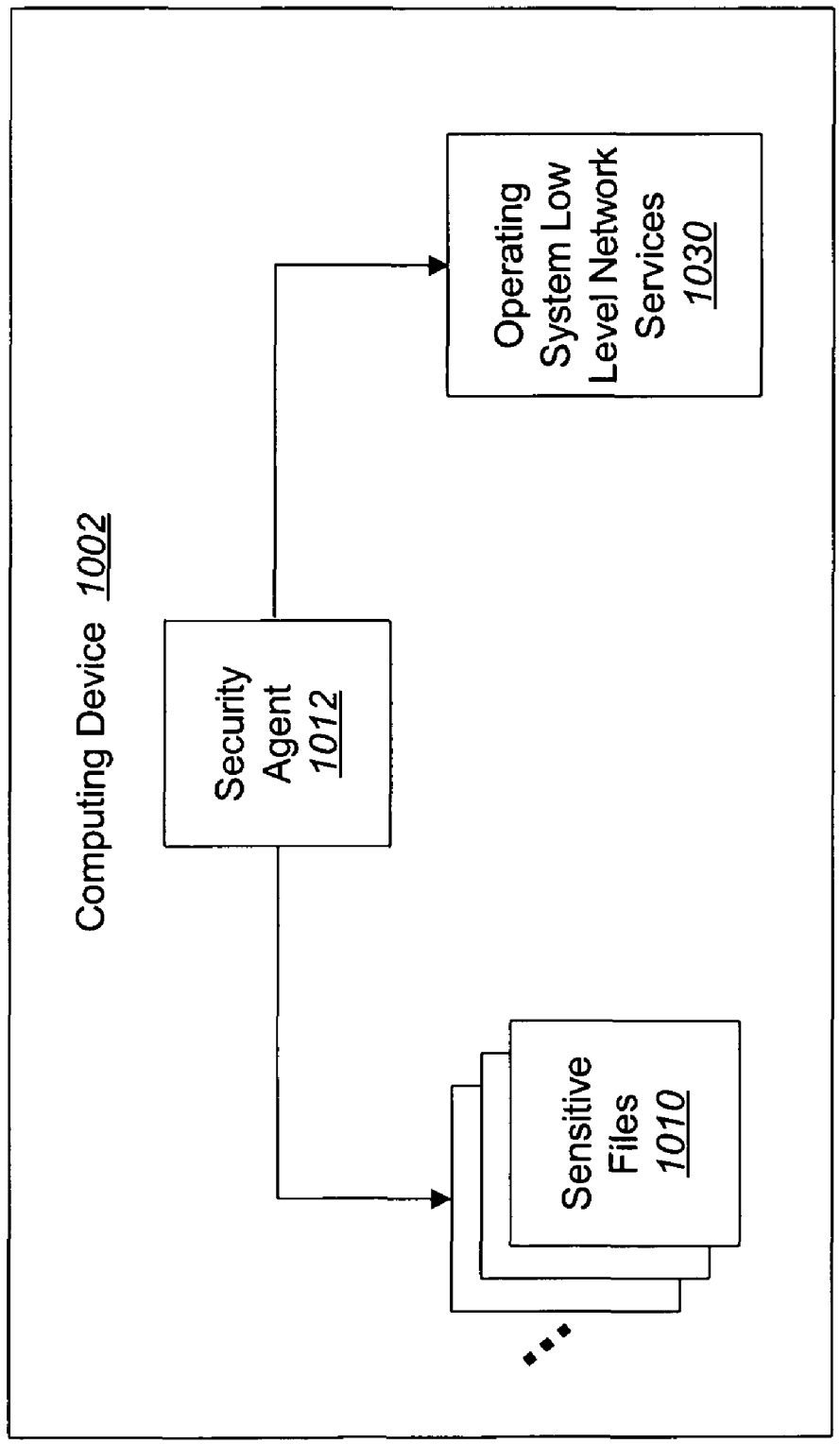
FIG. 10 is a block diagram illustrating the security agent installed on a computing device.

FIG. 10 is a block diagram illustrating the security agent 1012 installed on a computing device 1002. As shown, the security agent 1012 is logically situated between the sensitive files 1010 on the computing device 1002 and the low level network services 1030 of the operating system.

Figure 11:
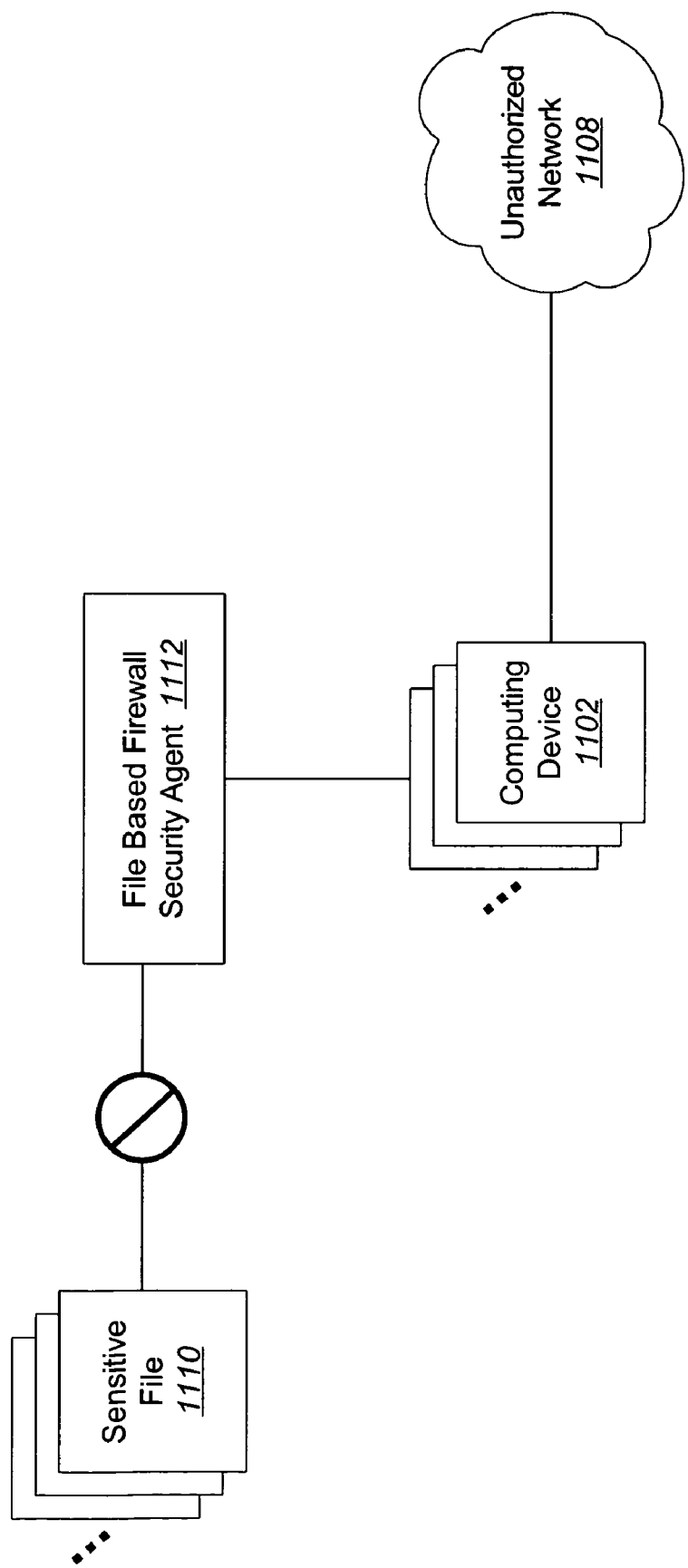
FIG. 11 is a block diagram illustrating the logical relationship between the security agent and the sensitive files on a computing device.

FIG. 11 is a block diagram illustrating the logical relationship between the security agent 1112 and the sensitive files 1110 on a computing device 1102. As shown, the security agent 1112 prevents access to the sensitive files 1110 on the computing device 1102 via an unauthorized network 1108 (or any other type of unauthorized connection).

Figure 12:
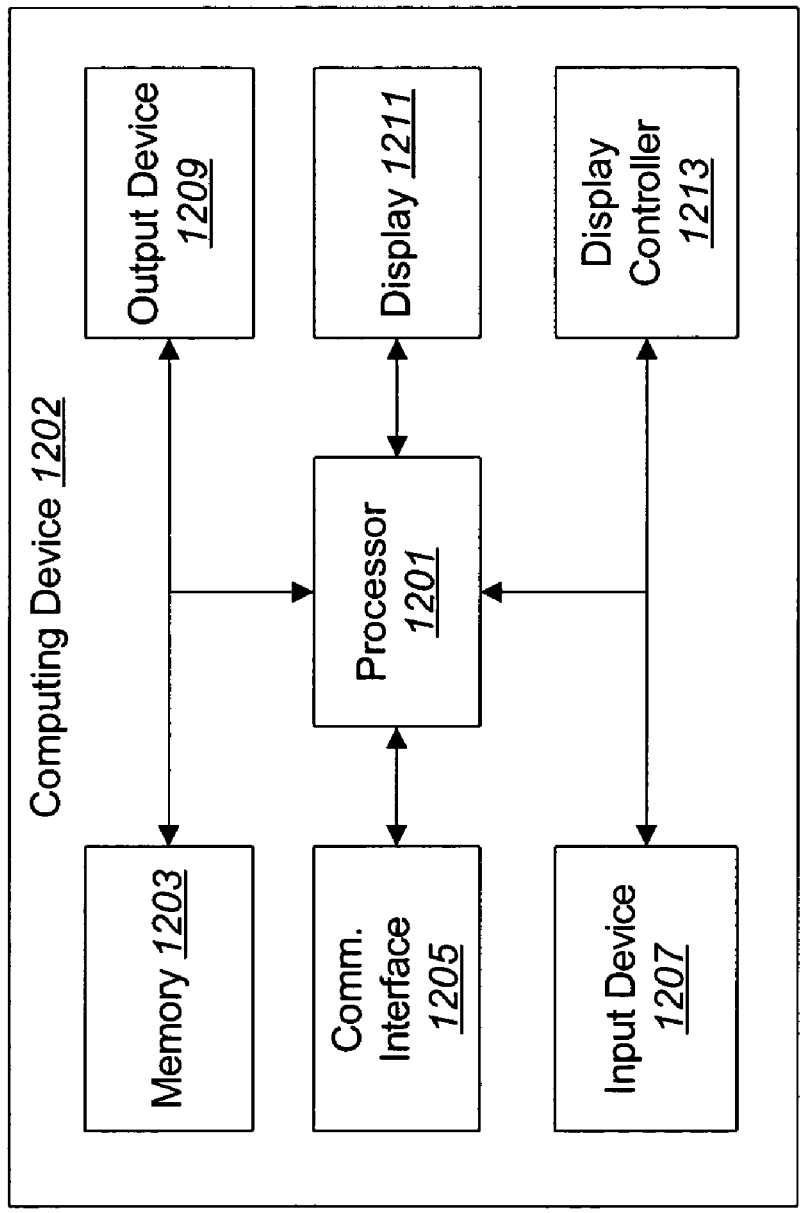
FIG. 12 is a block diagram illustrating the major hardware components typically utilized in a computing device.

FIG. 12 is a block diagram illustrating the major hardware components typically utilized in a computing device 1202. The illustrated components may be located within the same physical structure or in separate housings or structures.

The computing device 1202 includes a processor 1201 and memory 1203. The processor 1201 controls the operation of the computing device 102 and may be embodied as a microprocessor, a microcontroller, a digital signal processor (DSP) or other device known in the art. The processor 1201 typically performs logical and arithmetic operations based on program instructions stored within the memory 1203.

As used herein, the term "memory" 1203 is broadly defined as any electronic component capable of storing electronic information, and may be embodied as read only memory (ROM), random access memory (RAM), magnetic disk storage media, optical storage media, flash memory devices in RAM, on-board memory included with the processor 1201, EPROM memory, EEPROM memory, registers, etc. The memory 1203 typically stores program instructions and other types of data. The program instructions may be executed by the processor 1201 to implement some or all of the methods disclosed herein.

The computing device 1202 typically also includes one or more communication interfaces 1205 for communicating with other electronic devices. The communication interfaces 1205 may be based on wired communication technology, wireless communication technology, or both. Examples of different types of communication interfaces 1205 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 1202 typically also includes one or more input devices 1207 and one or more output devices 1209. Examples of different kinds of input devices 1207 include a keyboard, mouse, microphone, remote control device, button, joystick, trackball, touchpad, lightpen, etc. Examples of different kinds of output devices 1209 include a speaker, printer, etc. One specific type of output device which is typically included in a computer system is a display device 1211. Display devices 1211 used with embodiments disclosed herein may utilize any suitable image projection technology, such as a cathode ray tube (CRT), liquid crystal display (LCD), light-emitting diode (LED), gas plasma, electroluminescence, or the like. A display controller 1213 may also be provided, for converting data stored in the memory 1203 into text, graphics, and/or moving images (as appropriate) shown on the display device 1211.

Of course, FIG. 12 illustrates only one possible configuration of a computing device 1202. Those skilled in the art will recognize that various other architectures and components may be utilized. In addition, various standard components are not illustrated in order to avoid obscuring aspects of the invention.

Figure 13:
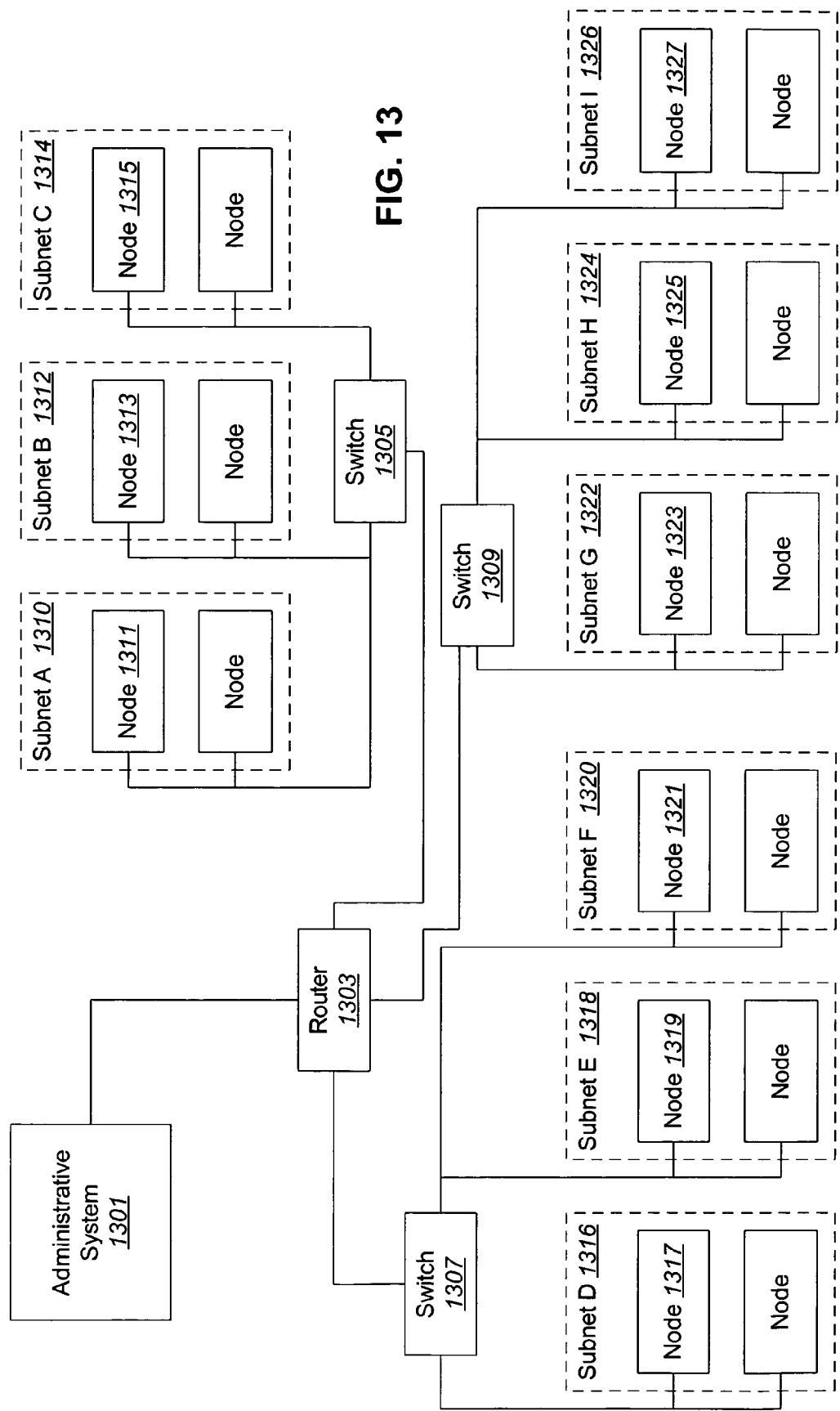
FIG. 13 is a block diagram illustrating an exemplary computer network on which the present systems and methods may be implemented.

FIG. 13 is a block diagram illustrating an exemplary computer network on which the present systems and methods may be implemented. In FIG. 13, an administrative system 1301 connects to a router 1303. The administrative system 1301 may correspond to the server 928 discussed above.

The router 1303 may be connected to three switches: a first switch 1305, a second switch 1307 and a third switch 1309. Each switch 1305, 1307, 1309 connects to three subnets. The first switch 1305 connects to three subnets 1310, 1312, and 1314. The second switch 1307 connects to three subnets 1316, 1318, and 1320. The third switch 1309 connects to three subnets 1322, 1324, and 1326. The network nodes or elements 1311, 1313, 1315, 1317, 1319, 1321, 1323, 1325 and 1327 represent computer systems or devices on the computer network. The administrative system 1301 may transmit the security agent 112 to each of the network nodes so that the security agent 112 may be installed on each of the network nodes.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a computing device, a method for protecting sensitive files from unauthorized access, comprising:
    detecting a connection of the computing device to an electronic device;
    accessing an authorized connection list, wherein the authorized connection list comprises a list of at least one authorized network or a list of at least one authorized connection type;
    determining whether the connection is identified in the authorized connection list; and
    if the connection is not identified in the authorized connection list:
        accessing sensitive file information which identifies multiple sensitive files stored on the computing device, wherein the sensitive files are not identified until after the connection has been identified as not being in the authorized connection list, wherein the sensitive file information is separate from the sensitive files; and
        preventing access to all of the sensitive files identified by the sensitive file information by performing an access prevention task after the connection is not identified in the authorized connection list, wherein the sensitive files continue to be stored on the computing device but all of the sensitive files cannot be accessed when access is being prevented.

2. The method of claim 1, wherein if the connection is not identified in the authorized connection list the method further comprises:
    detecting termination of the connection; and
    if the computing device does not have any other unauthorized connections, restoring access to the sensitive files identified by the sensitive file information.

3. The method of claim 1, wherein the connection occurs via a computer network.

4. The method of claim 3, wherein the network is a wireless network, and wherein the computing device is a mobile computing device.

5. The method of claim 1, wherein the connection is a direct connection.

6. The method of claim 1, wherein the access prevention task comprises locking the sensitive files.

7. The method of claim 1, wherein the access prevention task comprises encrypting the sensitive files.

8. The method of claim 1, wherein the computing device comprises a storage device, and wherein the access prevention task comprises moving the sensitive files to a host-protected area of the storage device.

9. The method of claim 1, wherein the sensitive file information is a reference to a directory in which at least one of the sensitive files is stored.

10. The method of claim 1, wherein the sensitive file information is a list of the sensitive files.

11. In an administrative system which distributes software to a plurality of computing devices on an enterprise network, a method comprising:
   providing a security agent, wherein after installation on a computing device the security agent is configured to:
      detect a connection of the computing device to an electronic device;
      access an authorized connection list, wherein the authorized connection list comprises a list of at least one authorized network or a list of at least one authorized connection type;
      determine whether the connection is identified in the authorized connection list; and
      if the connection is not identified in the authorized connection list:
         access sensitive file information which identifies multiple sensitive files stored on the computing device, wherein the sensitive files are not identified until after the connection has been identified as not being in the authorized connection list, wherein the sensitive file information is separate from the sensitive files; and
         prevent access to all of the sensitive files identified by the sensitive file information by performing an access prevention task after the connection is not identified in the authorized connection list, wherein the sensitive files continue to be stored on the computing device but all of the sensitive files cannot be accessed when access is being prevented; and
   transmitting the security agent to the plurality of computing devices via the enterprise network.

12. The method of claim 11, further comprising:
   providing the authorized connection list;
   providing the sensitive file information; and
   transmitting the authorized connection list and the sensitive file information to the plurality of computing devices via the enterprise network.

13. A computing device that is configured for protecting sensitive files from unauthorized access, comprising:
   a processor;
   memory in electronic communication with the processor; and
   instructions stored in the memory, the instructions being executable to:
      detect a connection of the computing device to an electronic device;
      access an authorized connection list, wherein the authorized connection list comprises a list of at least one authorized network or a list of at least one authorized connection type;
      determine whether the connection is identified in the authorized connection list; and
      if the connection is not identified in the authorized connection list:
         access sensitive file information which identifies multiple sensitive files stored on the computing device, wherein the sensitive files are not identified until after the connection has been identified as not being in the authorized connection list, wherein the sensitive file information is separate from the sensitive files; and
         prevent access to all of the sensitive files identified by the sensitive file information by performing an access prevention task after the connection is not identified in the authorized connection list, wherein the sensitive files continue to be stored on the computing device but all of the sensitive files cannot be accessed when access is being prevented.

14. The computing device of claim 13, wherein if the connection is not identified in the authorized connection list the instructions are further executable to:
   detect termination of the connection; and
   if the computing device does not have any other unauthorized connections, restore access to the sensitive files identified by the sensitive file information.

15. The computing device of claim 13, wherein the access prevention task comprises at least one of locking the sensitive files, encrypting the sensitive files, and moving the sensitive files to a host-protected area of a storage device.

16. A non-transitory computer-readable medium for storing program data, wherein the program data comprises executable instructions, the executable instructions being executable to:
   detect a connection of a computing device to an electronic device;
   access an authorized connection list, wherein the authorized connection list comprises a list of at least one authorized network or a list of at least one authorized connection type;
   determine whether the connection is identified in the authorized connection list; and
   if the connection is not identified in the authorized connection list:
      access sensitive file information which identifies multiple sensitive files stored on the computing device, wherein the sensitive files are not identified until after the connection has been identified as not being in the authorized connection list, wherein the sensitive file information is separate from the sensitive files; and
      prevent access to all of the sensitive files identified by the sensitive file information by performing an access prevention task after the connection is not identified in the authorized connection list, wherein the sensitive files continue to be stored on the computing device but all of the sensitive files cannot be accessed when access is being prevented.

17. The non-transitory computer-readable medium of claim 16, wherein if the connection is not identified in the authorized connection list the executable instructions are further executable to:
   detect termination of the connection; and
   if the computing device does not have any other unauthorized connections, restore access to the sensitive files identified by the sensitive file information.

18. The non-transitory computer-readable medium of claim 16, wherein the access prevention task comprises at least one of locking the sensitive files, encrypting the sensitive files, and moving the sensitive files to a host-protected area of a storage device.

* * * * *